No. 789,147. PATENTED MAY 9, 1905.
S. J. EDMISTON.
PROCESS OF AND PRODUCT FOR WALL FACINGS AND DECORATIONS.
APPLICATION FILED MAY 27, 1904.
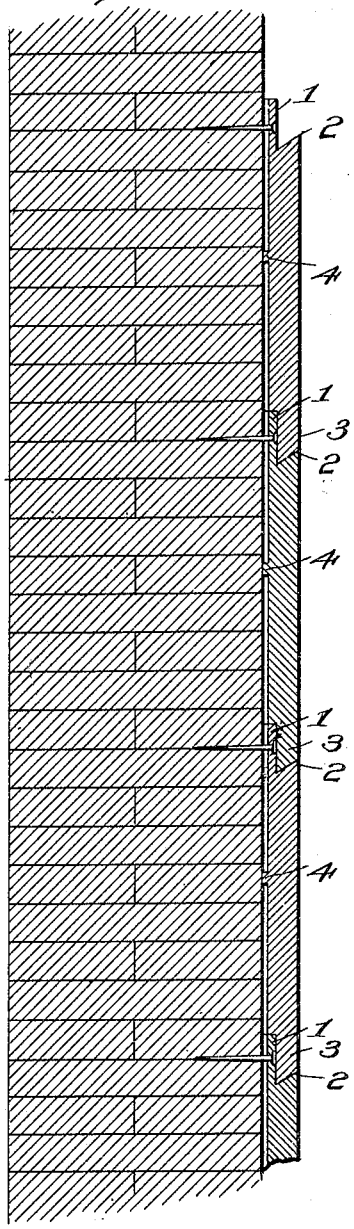
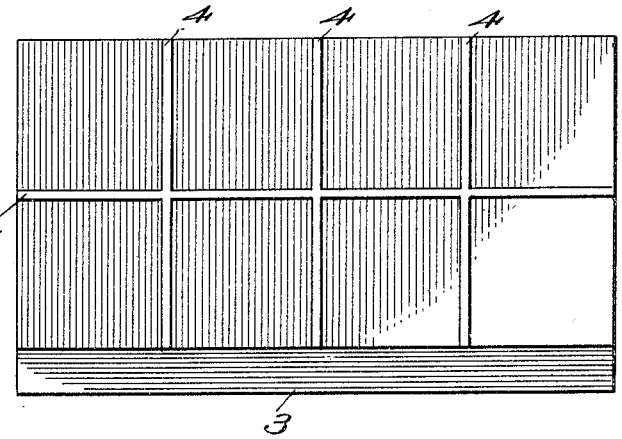

No. 789,147.

Patented May 9, 1905.

UNITED STATES PATENT OFFICE.

SAMUEL JOSEPH EDMISTON, OF GREENWICH, NEW YORK.

PROCESS OF AND PRODUCT FOR WALL-FACINGS AND DECORATIONS.

SPECIFICATION forming part of Letters Patent No. 789,147, dated May 9, 1905.

Application filed May 27, 1904. Serial No. 210,134.

*To all whom it may concern:*

Be it known that I, SAMUEL JOSEPH EDMISTON, a citizen of the United States, residing at Greenwich, in the county of Washington and State of New York, have invented certain new and useful Improvements in Processes of and Products for Wall-Facings and Decorations; and I do hereby declare the following to be a full, clear, and exact description of the invention, such as will enable others skilled in the art to which it appertains to make and use the same.

For interior house decorations and wall-facings I have produced a new manufacture to take the place of the usual lath and plaster walls and ceilings and to be used as wainscoting, moldings, and like wall-finishings; and my invention resides in a new process and in the product thereof whereby such manufactures may be made articles of trade in imitation of marble or stone slabs, burned or baked tiling, or moldings, to be secured to the wall by any suitable interlocking construction. The manufacture is the producing of ground wood in a pulpous mass and in the process of treating it so that its form may be suited for any particular use.

In the accompanying drawings I have shown in Figure 1 one way of fastening the slabs to the wall and interlocking them, and Fig. 2 shows the rear side of a slab with strengthening-ribs.

The process consists in treating either or a combination of old papers, rags, burlaps, paper-box board, ropes, finely-ground spruce or poplar wood, or any fibrous material as a pulpous mass, and in such condition the water is extracted therefrom by passing it through rollers or some other suitable method and is subjected to sufficient heat to extract the remaining moisture therefrom to bring it to a dry flaky condition in quantity large enough to form a supply. From this supply quantities may be taken and dyed with any suitable coloring fluid and again dried into a flaky condition. It is then mixed with liquid glue until it becomes the consistency of dough, when it is packed in pans that are shaped or formed to produce the desired product, such as slabs for wall-facings, wainscoting, moldings, and the like. Thus packed the pans are put into an oven of suitable temperature and the packed substance baked until it is thoroughly hardened and dried. It is then removed from the pans and subjected to a smoothing operation by passing it between sandpaper-rolls or by other means that will give a smooth face and a uniform thickness to the slabs. The articles thus colored, hardened, and smoothed are then treated to a bath of shellac or some other suitable coating which serves as a filling for the pores. When this bath has dried, the product is treated to a bath of varnish or japan and is again placed in an oven of suitable temperature to cause the varnish to be baked sufficiently to produce a satisfactory finish. In this process it will be understood that the product can be made to represent by proper mixture of colors any imitation of any kind of marble or stone from finely-ground wood or aformentioned materials. Wall-facings thus produced will form a damp-proofing to the wall, because the baking in the first operation causes great shrinkage and contraction and produces the density, and the baking of the varnish or japan finish on the last operation will render the product absolutely impervious to moisture. The facing can be applied to any wall or studding and made of any size suited to the place and its requirement. Whatever the colors and character of the imitations may be they are embodied in the manufacture and developed in the process and rendered permanent.

The liquid glue is used as a binder and renders the product tenacious and tough, so that it can be nailed without danger of splitting or cracking. The slabs are light and being submitted to successive steps of drying under heat and of coating will prevent it from warping and adapt it for paneling, siding, or sheathing. The wall whether of wood, brick, or other material is made with an even surface, against which the slabs or panels are nailed, one lapping with the other at the joints and locking them to each other by means of articulating joints of any suitable construction. As shown, this joint is made by a flange 1 on the upper edge of the slab, which forms an extension of the back surface which joins an oblique shoulder 2, which terminates at the front face of the slab, forming thereby an angular recess along the upper edge. The lower edge 3 of the joining-slab is made the counterpart, so that the interlocking parts form a closed joint with the oblique shoulders joining with an acute angle and securing the joining-slabs together. Each edge of each slab is joined and interlocked in the same way. The wall-joining flange of each slab is secured to the wall by nails or screws which pass through the flange and have their heads countersunk therein. The surface-joints can be pointed up in the complete facing, and as a means of giving strength to the article it is formed with ribs 4 on the inner side, which in securing the slabs to a wall serve to form an air-space between the slab and the wall. In this separation of the slabs from the wall they are protected from the effects of moisture that may penetrate the wall.

Referring to the materials used, it will be understood that they are first assembled into a wet mass, which is subjected to a treatment that forms the materials into a pulpy mass, and after having been passed through suitable rollers to extract the water, as stated, it is delivered therefrom in small pieces, because the consistency of the material at this stage will not permit it to assume sheet form. In this piecemeal condition the mass is subjected to an agitating or stirring operation until thoroughly dry, which leaves the pieces in a granular or flaky condition and which is thus prepared as a supply. From this supply the necessary quantity as may be required for the work is taken and colored with suitable coloring fluid and is again dried, as before stated. The mixing of the dry mass with liquid glue and being stirred until it becomes in a plastic condition renders it easy to be packed in pans of the size and shape of the desired product and baked, as heretofore described. It will be understood that the material after being thus baked will have hardened into the desired form and that in the final or finishing step the product will be again subjected to a temperature that while giving the proper degree of heat to bake the varnish care is taken that such temperature is not of a degree to injuriously affect the tenacity of the product. There is no significance in any particular proportions of the materials, and as to the coloring-matter, its quantity, and manner of applying, and the proportion of the binder, they will be determined by the workman.

I claim—

1. The process of manufacturing slabs, panels and the like for wall and ceiling facings, the same consisting in finely grinding fibrous materials to a pulpous mass, adding a coloring fluid, drying the mass to a flaky or granular condition, mixing therewith liquid glue as a binder, baking the mass into slabs, or other manufactures, subjecting the baked slabs to a smoothing operation, treating the slabs to a bath of shellac and finally treating the product to a bath of baking-varnish under a suitable temperature.

2. The process of manufacturing slabs, panels, tiles and the like, for wall and ceiling facings, the same consisting in finely grinding a mixture of old papers, rags, burlaps, paper-box board, ropes or a combination of any fibrous material, to a pulpous mass extracting the water therefrom by pressure, subjecting it to a drying operation to bring it to a flaky or granular condition, adding a coloring fluid, mixing therewith liquid glue as a binder, baking the mass into slabs or other manufactures, and treating the baked slabs to a bath of shellac, or other varnish, under a suitable temperature.

3. A product of fibrous material for wall, ceilings, facings or floors, baked in slabs and like manufactures, consisting of finely-ground fibrous material, colored and dried with a binding agent, and finished with a coating of varnish under heat.

4. A molded slab, tile or the like for wall-facings made of fibrous materials, baked in a pulpous mass, colored and dried with a binding agent, finished with a coating of varnish and formed with strengthening-ribs.

In testimony whereof I have signed my name to this specification in the presence of two subscribing witnesses.

SAMUEL JOSEPH EDMISTON.

Witnesses:
W. A. VAN KIRK,
FRANCES WILBUR.